J. KOLLAR.
NOODLE CUTTER.
APPLICATION FILED JAN. 28, 1919.
1,321,215.
Patented Nov. 11, 1919.
*Fig. 1.*
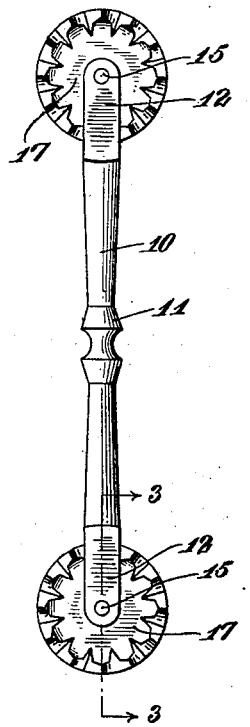
*Fig. 2.*
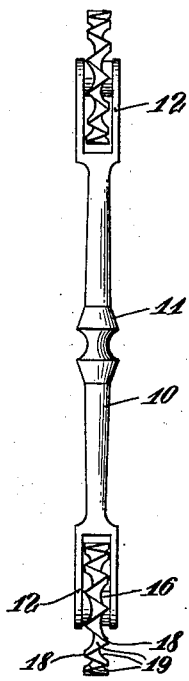
*Fig. 4.*
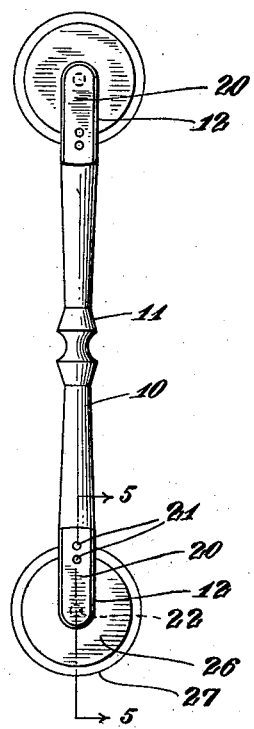
*Fig. 3.*
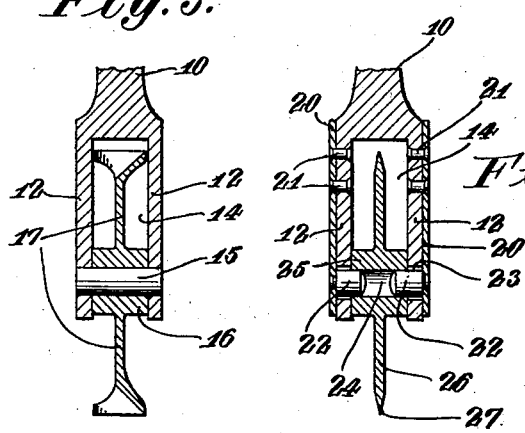
*Fig. 5.*
INVENTOR
John Kollar.
BY
his ATTORNEY

UNITED STATES PATENT OFFICE.

JOHN KOLLAR, OF CHICAGO, ILLINOIS.

NOODLE-CUTTER.

1,321,215.   Specification of Letters Patent.   Patented Nov. 11, 1919.

Application filed January 28, 1919. Serial No. 273,575.

*To all whom it may concern:*

Be it known that I, JOHN KOLLAR, a citizen of Hungary, residing at Chicago, county of Cook, and State of Illinois, have invented certain new and useful Improvements in Noodle-Cutters, of which the following is a specification.

This invention relates to improvements in implements for cutting noodle dough or like plastic sheets into strips, and has as its special object the provision of an implement which may be readily manipulated so as to produce a strip of noodle dough or the like, having either serrated or straight edges.

A further object is to provide an implement in which the cutters may be interchangeably engaged in an easy and convenient manner.

These and other like objects are attained by the novel construction and combination of parts hereinafter described and shown in the accompanying drawings, forming a material part of this disclosure, and in which:—

Figure 1 is a side elevational view showing a noodle cutter made in accordance with the invention.

Fig. 2 is an end view of the same.

Fig. 3 is an enlarged fragmentary sectional view, the section being taken on line 3—3 of Fig. 1.

Fig. 4 is a side elevational view showing a modified form of cutter and handle, and Fig. 5 is an enlarged transverse sectional view taken on line 5—5 of Fig. 4.

Referring to the drawings, the implement will be seen to consist of a handle 10 preferably formed with a raised central portion 11, so as to afford a secure grip in maneuvering the same in connection with the plastic mass from which the noodles are to be cut.

In the forms shown in Figs. 1, 2 and 3, each end of the handle 10 have extended forks 12, and journaled in the central space or opening 14 therebetween, upon fixed pivot pins 15, is the hub 16 of a cutter, the hub being formed with a central disk 17, extending outward to a laterally enlarged rim formed with a continuous profile consisting of sharply beveled angular points 18, the diagonally disposed material 19 therebetween presenting a cutting periphery engageable with the thin sheets of plastic dough, so as to form the same with a sinuous edge.

In the forms shown in Figs. 4 and 5, pairs of overlying spring plates 20 are secured upon the outer surfaces of forks 12 by rivets 21, and secured in the outer ends of the spring plates 20 are pairs of registering studs 22, adapted to pass freely through openings 23 formed in the fork sides 12, and enter the central bored opening 24 formed in the hub 25 of the cutter disk 26, which is here shown to be formed with a sharp angular cutting periphery 27.

In assembling the device, the spring plates 20 may be sprung outwardly so as to remove the short studs 22 from the opening in the hub of the cutter, permitting it to be removed for the purpose of cleansing, sharpening or interchanging for one of the zig-zag or fluted varieties, and it is preferable to have one of the zig-zag cutters at one end, and a plain cutter at the other end for reasons which will be obvious.

In operation, the dough having been spread upon a flat level surface, as a smooth board or the like, the cutter is used by hand, and obviously any desired width of noodle strips may be attained, either by the use of a guide or by a trained operator's hand.

Having thus described my invention, what I claim as new and desire to secure by Letters Patent, is—

In a noodle cutter, the combination with a handle adapted for manual operation, forks extending from the ends thereof, spring strips secured exteriorly of the surfaces of said forks, pairs of registering studs rigidly engaged upon the inner surface of said spring strips, said studs extending inwardly through openings formed in the forks, a hub disk containing a central bore pivoted upon said studs, and a peripheral cutting edge formed on said disk adapted to divide dough.

In testimony whereof, I have signed my name to this specification in the presence of two subscribing witnesses, this eleventh day of January, 1919.

JOHN KOLLAR.

Witnesses:
EMERY SZOEKE,
J. HODMAN.